Nov. 10, 1959 C. H. DAGNALL, JR., ET AL 2,912,504

DISCONNECT CONTROL OF TELEPHONE ANSWERING AND MESSAGE RECORDING DEVICES

Filed June 16, 1955 2 Sheets-Sheet 1

INVENTORS C. H. DAGNALL, JR.
C. G. MILLER

BY A. F. Kane

ATTORNEY

Nov. 10, 1959 C. H. DAGNALL, JR., ET AL 2,912,504

DISCONNECT CONTROL OF TELEPHONE ANSWERING AND MESSAGE RECORDING DEVICES

Filed June 16, 1955 2 Sheets-Sheet 2

INVENTORS C. H. DAGNALL, JR.
C. G. MILLER
BY A. F. Kane
ATTORNEY 2,912,504
Patented Nov. 10, 1959

2,912,504

DISCONNECT CONTROL OF TELEPHONE ANSWERING AND MESSAGE RECORDING DEVICES

Clarence H. Dagnall, Jr., Orange, and Charles G. Miller, Upper Montclair, N.J., assignors to Bell Telephone Laboratories, Incorporated, New York, N.Y., a corporation of New York Application June 16, 1955, Serial No. 515,868
2 Claims. (Cl. 179—6)

Figures 1, 3:
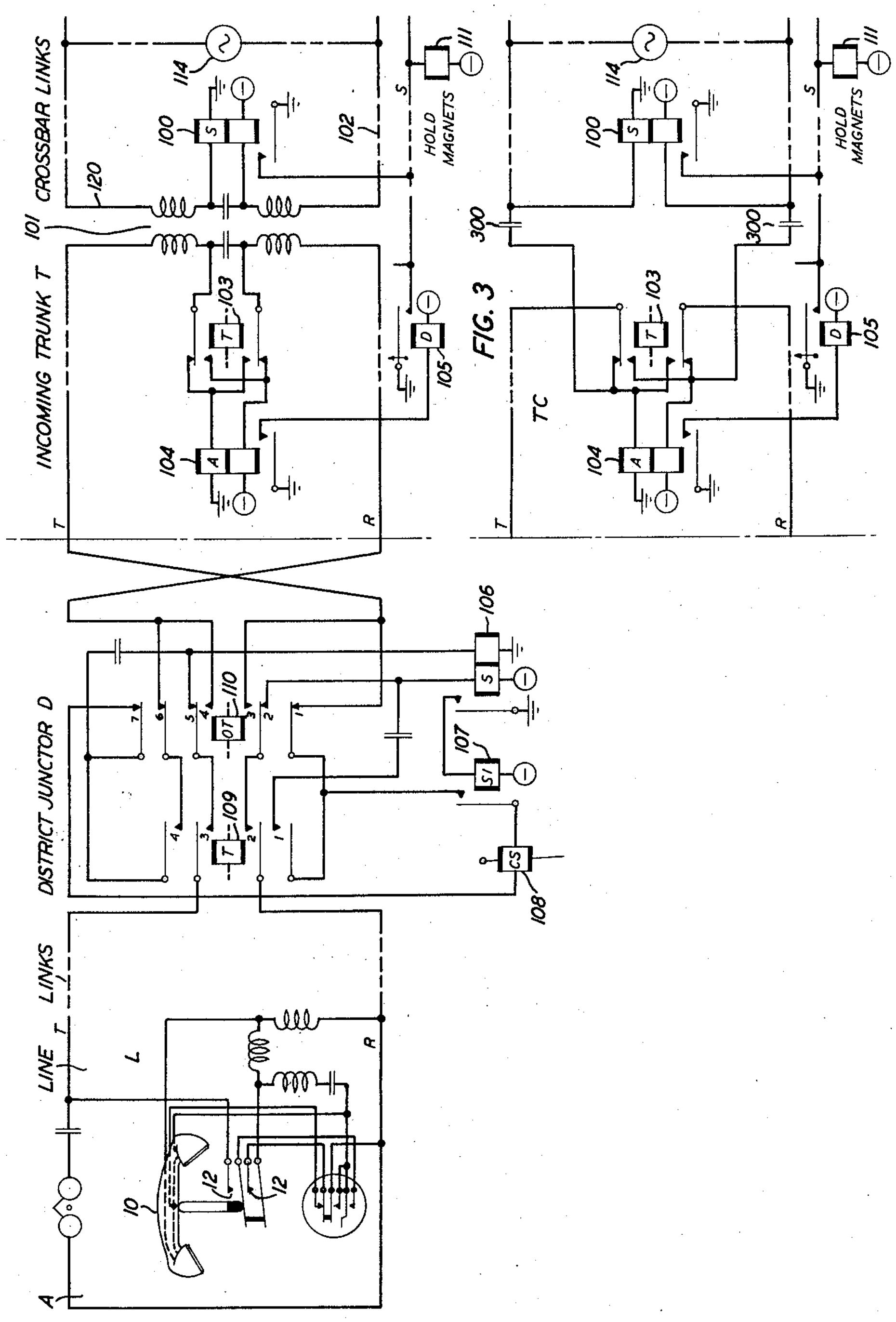

This invention relates to telephone systems involving the use of automatic telephone answering and message recording devices at subscribers' stations.

The telephone answering and message recording device used at a subscriber's station functions, during the absence of the subscriber or when the station is otherwise unattended, to recognize and automatically acknowledge telephone calls incoming to the station; to transmit to the calling party an advisory or informative message apprising him of the facts that the called party is not available and that the station is equipped with facilities for recording a message should he desire to transmit one; to record any message transmitted by the calling party for subsequent reproduction at the called station; and to restore itself to normal condition and to release the terminating end of the involved central office connection.

Usually, such devices are equipped to automatically terminate the recording of an incoming message at the end of a predetermined interval of time so as to insure the disconnection of the recording device from an established connection and the release of the connection, at some set time following the start of the recording interval, whether or not the calling subscriber utilizes the entire recording interval for transmitting a message. This "time out" feature is sometimes combined with what is generally nown as a "calling party disconnect" feature which insures the immediate disconnection of the recording device from an established connection and the release of involved central office equipment should the calling party disconnect prior to the expiration of the time interval allocated to the recording of a message. This "calling party disconnect" feature relies upon a supervisory relay in the recorder control circuit which responds to an open circuit condition resulting from the occurrence of a disconnect at the calling station. In other words, the control circuit for the supervisory relay includes the calling station loop and when the loop circuit is interrupted at the switchhook contacts at the calling station incident to a disconnect thereat, the supervisory relay circuit is opened and the relay releases to effect the disconnection of the recorder and the release of the established connection.

In some telephone systems connections between calling and called stations are physically discontinuous in that they involve inductively or capacitively coupled sections or links, so that the open circuit condition effected at the switchhook contacts at a calling station incident to a disconnect thereat, is ineffective to cause the release of the recorder-controlling supervisory relay. The "time out" feature, therefore, must be relied upon exclusively, to effect the disconnection of the recording mechanism and to initiate the release of an established connection. Obviously, such a condition results in tying up central office equipment for unnecessarily long intervals of time when a calling subscriber disconnects before the time interval allocated to message recording terminates, or without transmitting any message to the called station.

It also results in an uneconomical use of the recording medium at the called station.

It is one object of this invention to provide, in a telephone answering and message recording system, recorder-control means at a called subscriber's station which responds to disconnect signals transmitted from a calling subscriber's station to a called station by way of physically discontinuous signal transmitting circuits, or circuits which do not present a continuous direct-current path between its terminations.

This object is attained in accordance with a feature of the invention by the provision, in a recorder-control circuit at a called subscriber's station, of means for disconnecting a substation recorder from a central office connection and for initiating the release of the connection in response to the current surge or click produced by the operation of switchhook contacts at a calling subscriber's station incident to a disconnect operation thereat.

In accordance with another feature of the invention, means are provided in the recorder-control circuit for discriminating between a legitimate surge or click resulting from a disconnect operation at a calling station and false surges or clicks resulting from untimely and otherwise abnormal miscellaneous surge-producing conditions.

Figure 2:
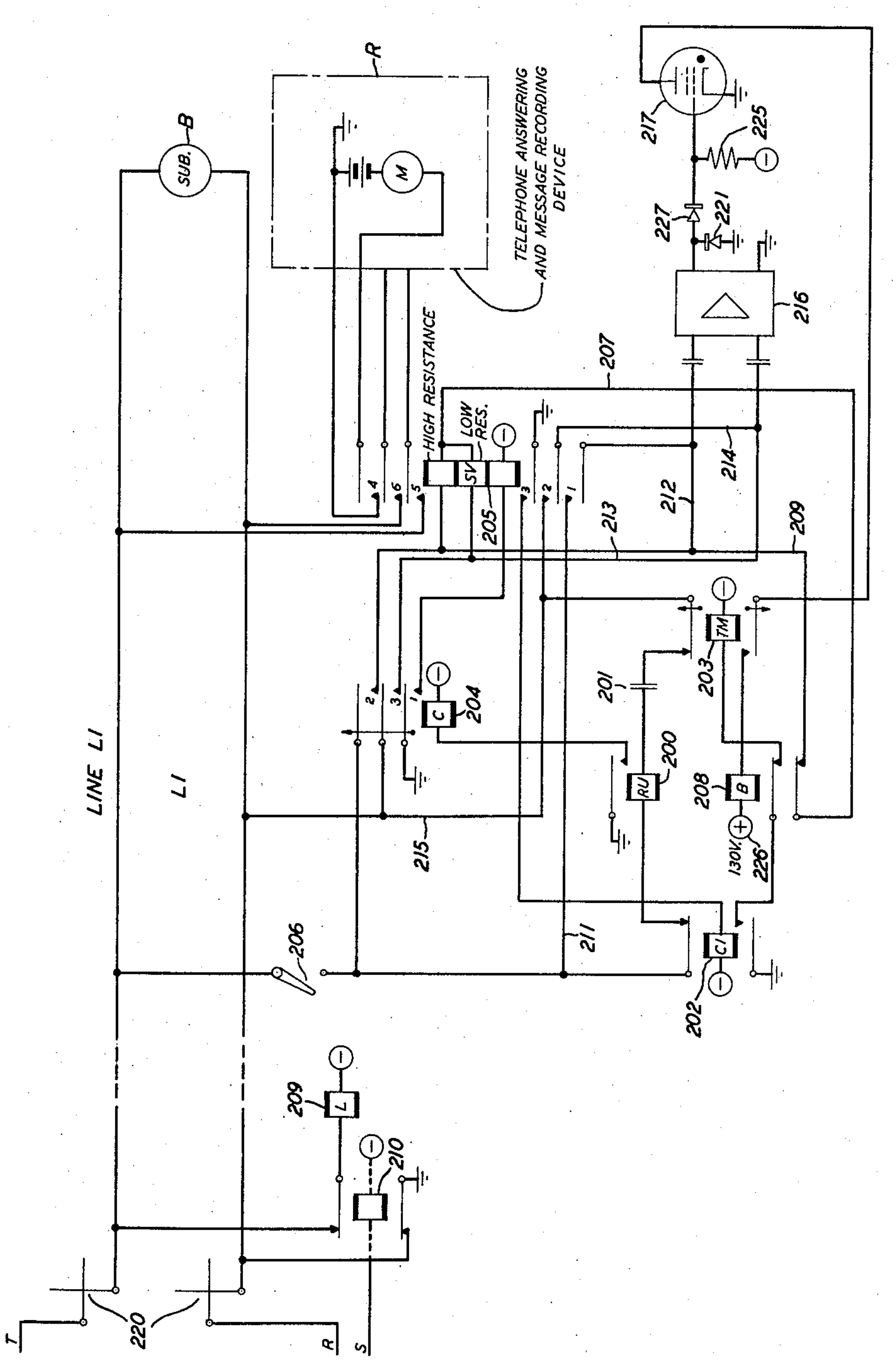

These and other features of the invention will be readily understood from the following description when read with reference to the accompanying drawings of which Figs. 1 and 2, when positioned with Fig. 2 to the right of Fig. 1, comprise a schematic diagram, partly skeletonized, of a telephone switching connection involving calling and called subscriber stations and an interposed signal transmission path comprising inductively coupled sections or links, and Fig. 3 is a fragmentary portion of a trunk circuit comprising capacitively coupled sections. It is understood that Fig. 3 may be substituted for that portion of the trunk circuit of Fig. 1 located immediately above it. The exemplary disclosures illustrate well-known types of crossbar connections. It is to be understood, however, that the invention is applicable to any switching system in which a connection between calling and called subscriber stations involves a physically discontinuous signal transmission path, that is, a path over which signals are transmitted between cooperating sections or links either inductively or capacitively.

Briefly stated, this invention is embodied in a recorder-control circuit at a called subscriber's station which functions, during an established connection between a calling line and a called line, to detect current surges or clicks legitimately or otherwise impressed on the called line; to simulate a "called party disconnect" condition and to apply such condition to the called line upon the occurrence of any such current surges; and to disconnect the recorder from the called line and to initiate the release of the terminating end of the established connection immediately upon receipt only of a legitimate current surge. Particularly, the control circuit of this invention comprises an amplifier, a rectifier, an impulse or threshold detector and a multiwinding supervisory relay, one winding of which is bridged across the called line to hold the terminating end of an established connection and to maintain the recorder connected to the called line. Upon receipt of a surge or click from any source, two of the windings of the supervisory relay are connected in series to thereby alter the character of the holding bridge and to simulate a "called party disconnect" condition which is applied to the connection for a measured period of time. If the altered bridge circuit encounters a condition which identifies a calling party disconnect, the supervisory relay releases to disconnect the recorder from the connection and to initiate the release of the terminating end of the connection. If the encountered condition is not one which characterizes a calling party disconnect, the normal holding bridge is reestablished and the surge detector restored to normal condition.

The circuits used for exemplary purposes involve a calling subscriber station and its associated line circuit L, which connects to a district junctor circuit D by way of a line link and controller circuit (not shown) which, in turn, is connected to the incoming trunk T via district link, office link, and cable between offices (not shown). The trunk T comprises two inductively coupled sections, the right one of which is connected to incoming link and line link circuits which involve crosspoints of crossbar switches, a pair of which is shown at the left of Fig. 2. The connection then extends to the called substation B by way of the usual line link and controller circuit (not shown) and the called line circuit L1.

When a call is originated at substation A and the connection is extended to the called line L1 in well-known manner, relay 109 is in its operated condition so that the windings of relay 106 are bridged across the calling line L and talking battery is supplied therethrough to the calling station. Relay 106 operates in the closed line loop causing relay 107 to operate and to connect the winding of supervisory relay 108 to the tip and ring conductors of the incoming trunk T for supervisory purposes. A circuit is then established extending from negative battery and including the lower winding of trunk relay 104, the back contact and lower armature of relay 103, the lower left winding of repeating coil 101, ring conductor of trunk T, the No. 6 armature contacts of relay 110, the No. 4 armature contacts of relay 109, the No. 7 armature contacts of relay 110, winding of relay 108, armature and front contact of relay 107, the No. 1 armature contacts of relay 110, tip conductor of trunk T, upper lift winding of repeating coil 101, upper armature and back contact of relay 103, upper winding of relay 104, and ground. Relay 108, operating in this circuit, performs no function which is necessary to an understanding of the present invention. Relay 104 operates in the circuit just traced and at its armature and front contact completes an obvious operating circuit for relay 105.

Relay 105, operated, applies ground to the sleeve conductor S to hold the hold magnets, such as magnet 111 and line hold magnet 210 operated, it being understood that in the process of completing the connection to the called station B certain select magnets (not shown) were previously operated to prepare crossbar switch crosspoints for operation in the well-known manner. A pair of such crosspoints is shown at 220 and is controlled by the line hold magnet 210 which, when operated, also disconnects the line relay 209 from the called line L1.

When the connection is advanced to the point where the called line has been tested and found idle, ringing current from the source schematically indicated at 114, traverses the established connection and, with switch 206 at substation B operated to closed position, passes through the switch contacts by way of the upper crosspoints 220, thence over the upper armature and back contact of relay 202, through the winding of relay 200, over condenser 201, over the back contact and upper armature of relay 203 and conductor 215, to the other side of line L1 and back to the source 114 by way of the lower crosspoints 220. Relay 200 operates in this circuit and completes an obvious operating circuit for relay 204.

At its No. 1 armature contacts, relay 204 completes an energizing circuit for supervisory relay 205 by way of its lowermost winding. At its Nos. 2 and 3 armature contacts, relay 204 extends the tip and ring conductors to terminals of the uppermost and middle windings of relay 205. It will be observed that the uppermost high resistance winding of relay 205, at this time, is shortcircuited by the outer armature and back contact of relay 208. Thus, the low resistance winding of relay 205 is bridged across the established connection to trip the ringing current in well-known manner and to hold the terminating end of the connection.

When relay 205 operates, as described, its No. 3 armature contacts complete an obvious operating circuit for relay 202, which relay, at its upper armature and back contact opens the operating circuit to relay 200, and at its lower armature and front contact completes an operating circuit for relay 203 which includes the inner armature and back contact of relay 208.

At its Nos. 1 and 2 armature contacts, relay 205 completes a locking circuit for itself which may be traced from negative battery, through the lower winding of relay 100, the lower right winding of repeating coil 101, ring conductor 102, lower crosspoints 220, conductor 215, No. 2 armature contacts of relay 205, conductors 214 and 213, middle winding of relay 205, conductor 207, lower armature and back contact of relay 208, conductors 209 and 212, No. 1 armature contacts of relay 205, conductor 211, contacts of switch 206, upper crosspoints 220, tip conductor 120, upper right winding of repeating coil 101, upper winding of relay 100 to ground. Relay 100 operates in this circuit and also applies ground to the sleeve conductor S so that the hold magnets 111 and 210 are now held operated under control of both relays 104 and 100.

At its Nos. 5 and 6 armature contacts, relay 205 connects the telephone answering and message recording device R to the established connection, and, at its No. 4 armature contacts establishes a local power circuit to the motor M which operates to drive the recording and reproducing mechanism of the device R.

The Nos. 1 and 2 armature contacts of relay 205 serve also to connect the input leads of supervisory amplifier 216 to the established connection, the output of which is connected to the grid of space discharge device 217 by way of rectifiers 220 and 221.

When relay 203 operated, as described, it opened another point in the ringing circuit to relay 200 and connected the winding of relay 208 to the plate circuit of the tube 217. With the device R connected to the line L1 and motor M energized, any previously recorded informative message is transmitted from substation B over the established connection to substation A. The calling party, after receiving this message, may, if so inclined, transmit a message to be recorded at substation B and at the conclusion of the transmitted message, restore the telephone handset 10 to its support and thereby open the switchhook contacts 12. Relay 106 is thereupon de-energized and releases its armature to effect the release of relay 107. Relay 107, released, disconnects the calling supervisory relay 108 from the connection, whereupon relay 104 is de-energized and releases relay 105. Relay 105, released, removes holding ground from the sleeve conductor S whereupon the hold magnets 111 and 210 release to open the switch crosspoints such as 220 controlled thereby.

Incident to the opening of the switchhook contacts 12 at substation A and as a direct consequence thereof, the current supply circuit, which includes the windings of relay 106, is interrupted to produce a current surge or click. This surge traverses the tip and ring conductors of the connection by way of the repeating coil 101 and is impressed on the line L1, is amplified at 216, rectified at 227 and 221 and is applied to the grid of tube 217 which is normally biased from negative battery by way of resistance 225. If the received surge is of sufficient magnitude, and the opening of switchhook contacts 12 produces a surge of such magnitude, the tube 217 fires and plate current from the source 226 flows through the winding of relay 208 causing this relay to operate and to open the short circuit from the uppermost high resistance winding of relay 205.

The increased resistance of the loop as seen by relay 100 when the short is removed from the high resistance winding of relay 205 causes relay 100 to release. When the receiver was replaced on the switchhook breaking contacts 12, relay 106 released. This released relay 107 which opened the loop toward the trunk and released relay 104. When relay 104 released it allowed relay 105 to release. With both relays 105 and 100 released, ground is removed from the hold magnets and they release.

It will be observed that during the established connection relay 205 is held operated from battery and ground through the windings of relay 100. In this connection, it will be noted that ground is connected to the tip conductor 120 and negative battery to the ring conductor 102. When the line hold magnet 210 is de-energized, negative battery and ground are reconnected to the line L1 but in reversed manner, that is, ground is connected to the ring conductor and negative battery to the tip conductor.

The two upper windings of relay 205, incident to the operation of relay 208, are now connected in series across the line L1 and encounter the reversed polarity condition resulting from the release of line hold magnet 210. The current traversing the two upper windings of relay 205 now passes through zero value to cause the immediate release of the relay. Relay 205, released, disconnects the device R from the line L1, de-energizes the motor M, opens its own locking circuit and disconnects the amplifier 216 and associated surge detecting circuit from the line. Thus the recorder is released and the substation B is rendered immediately available for subsequent calls. Relay 205 released, also permits relay 202 to restore its armatures.

When relay 208 operated on the disconnect surge, it started the release of slow-releasing relay 203. When this relay finally restores its armatures, relay 208 is released. Thus the circuit at substation B is restored to normal and the tube 217 is de-energized.

Had the surge, just described, been caused by some abnormal condition and not as a result of a disconnect at substation A, it would have caused the operation of relay 208, as described, to open the short circuit about the upper winding of relay 205. However, the hold magnet 210 would still be operated so that the now serially connected upper windings of relay 205 would not encounter the polarity reversal described above and would not release. It would still hold operated at battery and ground associated with the windings of relay 100.

It is not deemed necessary to describe in detail the operation of the system involving the capacitively coupled sections of trunk TC shown in Fig. 3. It is apparent that the trunk of Fig. 3 distinguishes from that of Fig. 1 only in the substitution of the tip and ring condensers 300 for the repeating coil 101. The system involving Fig. 3 operates exactly as does the system involving Fig. 1 except that the surge or click signals are transmitted between trunk sections capacitively by way of condensers 300, instead of inductively as in Fig. 1.

What is claimed is:

1. In a telephone system, a calling line, a calling station thereon, a called line, a called station thereon, a transmission path interconnecting said lines, a recorder at said called station, switching means for connecting said recorder to said called line, a multiwinding supervisory relay controlling said switching means, a source of potential, means effective upon the completion of a connection involving said calling and said called lines for operating said relay and connecting one winding thereof to said transmission path for energization by current from said source of potential, and means responsive to a disconnect at said calling station for reversing the polarity of said source of potential with respect to the said one winding of said relay and for connecting another of the windings of said relay in series aiding with the said one relay winding to cause said relay to operate said switching means and disconnect said recorder from said called line.

2. In a telephone system, a calling line having a calling station thereon, a called line having a called station thereon, a connection involving originating and terminating ends interconnecting said stations, said connection being subject to current surges, a recorder at said called station, switching means connecting said recorder to said called line, a multiwinding relay controlling the operation of said switching means, means responsive to current surges on said connection for connecting the windings of said relay to said called line in such manner as to render said relay effective to cause said switching means to disconnect said recorder from said called line only when said called line is characteristically marked, and means responsive to the release of said connection at said calling station for characteristically marking said calling line.

References Cited in the file of this patent

UNITED STATES PATENTS

| | | |
|---|---|---|
| 2,200,351 | Whitehead | May 14, 1940 |
| 2,650,951 | Kobler | Sept. 1, 1953 |
| 2,699,466 | Kobler | Jan. 11, 1955 |
| 2,784,254 | Lane | Mar. 5, 1957 |